Aug. 15, 1944.    W. A. HYLAND    2,355,728
FERTILIZER DISTRIBUTOR
Filed Jan. 13, 1941    4 Sheets-Sheet 1

INVENTOR.
WILLIAM A. HYLAND
BY

Aug. 15, 1944. W. A. HYLAND 2,355,728
FERTILIZER DISTRIBUTOR
Filed Jan. 13, 1941 4 Sheets-Sheet 2

INVENTOR.
WILLIAM A. HYLAND

Aug. 15, 1944.   W. A. HYLAND   2,355,728
FERTILIZER DISTRIBUTOR
Filed Jan. 13, 1941   4 Sheets-Sheet 3

INVENTOR.
WILLIAM A. HYLAND

Patented Aug. 15, 1944

2,355,728

UNITED STATES PATENT OFFICE 2,355,728

FERTILIZER DISTRIBUTOR

William A. Hyland, Horicon, Wis., assignor to The Van Brunt Manufacturing Company, Horicon, Wis., a corporation of Wisconsin Application January 13, 1941, Serial No. 374,258

25 Claims. (Cl. 222—231)

This invention relates generally to distributing apparatus and is more particularly concerned with fertilizer distributors that are adapted to be attached to a grain drill.

The object and general nature of the present invention is the provision of a new kind of helical spring wire distributing member especially constructed and arranged to provide for a smooth continuous flow of fertilizer over a relatively great extent of adjustment. More particularly, it is a feature of this invention to provide a fertilizer attachment in which the parts may be readily removed for cleaning and in which the construction is such that there is little opportunity for fertilizer to become caked and hardened to the extent of interfering with the proper operation of the distributor. In this connection, it is a further feature of this invention to provide a helical spring wire distributing member in which, if there should be some fertilizer that becomes caked or hardened thereon, the subsequent operation of the machine will serve to break loose the hardened fertilizer without danger of breaking any of the parts of the distributing mechanism.

Another feature of this invention is the provision of an improved baffle construction, particularly adapted to cooperate with the helical spring wire distributing member to the end that all material is delivered to the distributing member in the proper manner and without the danger of any leakage past the distributing member directly to the discharge outlets which would interfere with the uniformity of distribution desired. More specifically, it is another feature of this invention to provide means by which the baffle as well as the agitating member may be removed for cleaning and other purposes quickly and conveniently.

Another important feature of the present invention is the provision of discharge outlets along the side of the hopper, rather than in the bottom thereof. The advantage of this construction is that the tendency for the fertilizer to continue to flow out of the discharge openings when standing is practically eliminated. Further, the provision of the discharge outlets in one side of the hopper, with a helical spring wire distributor arranged to lie close to the discharge openings, effectively prevents fertilizer from flowing out when the outfit is standing and not in operation. In this connection it is a further feature of this invention to provide for two distinct ranges of adjustment, one in which relatively fine adjustment of small flows is available and another in which large flows can be provided for without requiring any readjustment for movement of any part through an extensive range.

Another feature of this invention is the provision of improved means for driving the fertilizer distributing members in an improved manner from the grain drill axle shafts, with clutch means controlling the drive and actuated by suitable connections with the raising means for the grain drill furrow openers.

These and other objects and advantages of the present invention will be apparent to those skilled in the art after a consideration of the following detailed description, taken in conjunction with the accompanying drawings.

Figure 1:
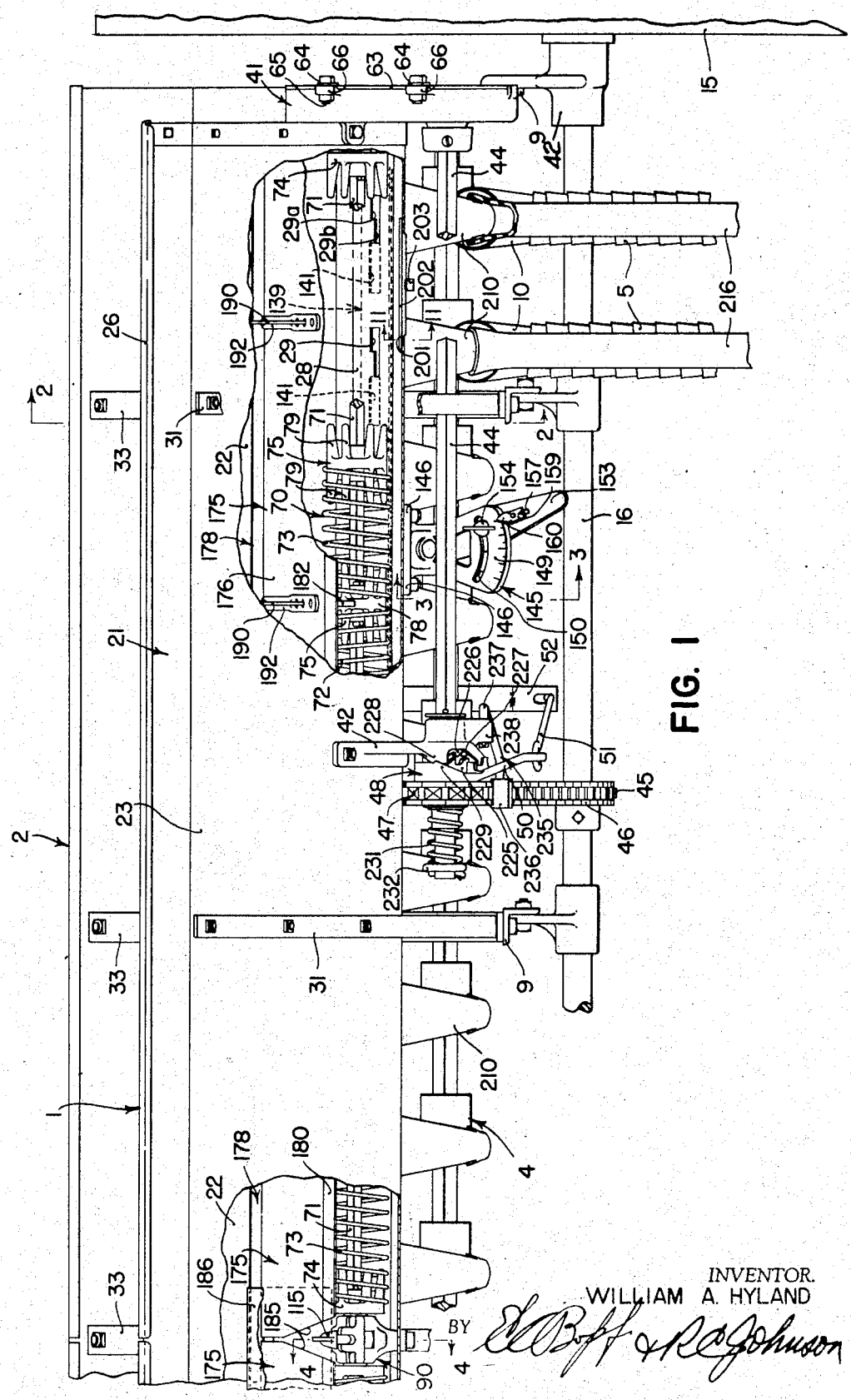
Figure 1 is a rear view of a grain drill with fertilizer attachment, in which the principles of the present invention have been incorporated, certain parts of the fertilizer hopper being broken away to show interior construction.
Figures 2, 3, 8:
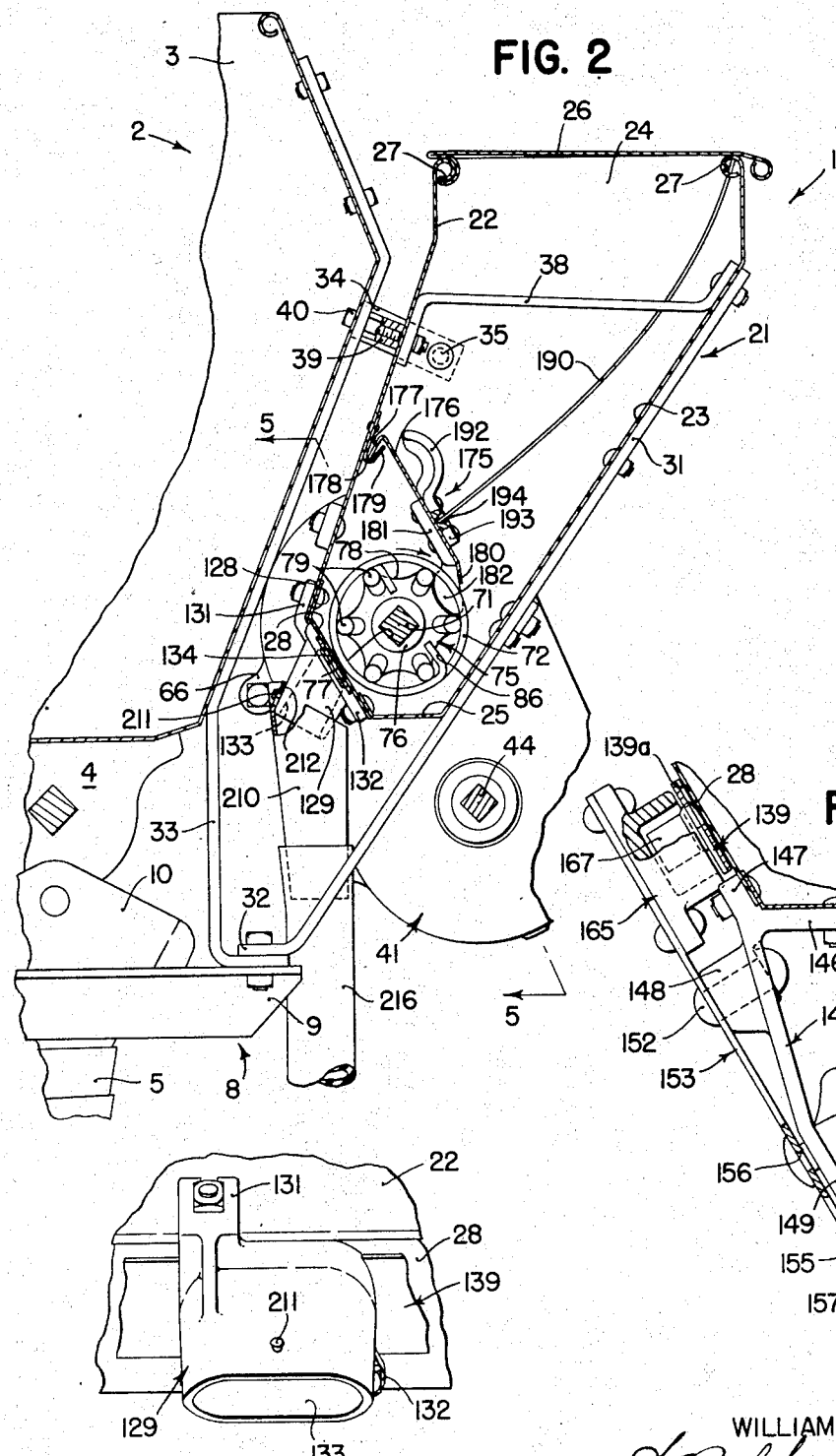
Figure 2 is a cross sectional view taken generally along the line 2—2 of Figure 1.
Figure 3 is a view taken generally along the line 3—3 of Figure 1, showing the lever and associated parts for shifting the gate to adjust the rate of distribution.
Figure 8 is a fragmentary view of one of the spout castings.

Referring now to the drawings, more particularly to Figures 1, 2 and 3, the fertilizer attachment, which forms the principal part of the present invention, is indicated by the reference numeral 1 and is arranged to be supported on a grain drill 2, which includes a seed box 3, seed selecting mechanism 4, and suitable furrow opening means to which seed is delivered by a plurality of seed tubes 5. The grain drill seed box 3 is supported upon a frame 8, certain frame bars 9 of which extend generally rearwardly of the seed box 3 to provide a support for the fertilizer attachment 1. Spouts 10 receive the seed and serve as a support to which the upper ends of the seed tubes 5 are attached. The several furrow openers of the grain drill are raised and lowered by means of arms 12 fixed in any suitable manner to a lifting rock shaft 13. The grain drill 2 is supported on ground wheels 15 to which axle shafts 16 are connected. Preferably, there are two axle shafts 16 that are maintained in alignment but are arranged so that each may rotate independently, and the grain drill frame 8 is supported in any suitable manner on the axle shafts 16. The grain drill seeding mechanism 4 is driven from the axle shafts 16 in any suitable manner, the details of which are per se not concerned in the present invention.

Referring now to the fertilizer attachment, the latter includes a hopper 21 which includes a front side wall 22, a rear side wall 23, opposite end walls 24 and a bottom wall 25. The hopper is also provided with a hinged cover 26, and the upper edges of the front and rear walls 22 and 23 are beaded, as at 27, to provide extra strength and to provide a smooth upper edge. The front wall 22 includes a lower angled section 28, to which reference will be made below, but it is to be noted at this point that the wall section 28 joins the hopper bottom 25 at a fairly steep angle so that the fertilizer discharge openings 29 therein face generally in a fore and aft direction so as to eliminate the tendency for fertilizer to run out of the openings when the machine is not in operation, which not infrequently occurs in distributing apparatus of this kind in which the discharge openings are in the horizontal bottom wall portions of the hopper.

The fertilizer attachment hopper 21 is supported on the rear ends of the frame bars 9 by means of a plurality of box straps or braces 31 bolted to the rear side wall 23 of the hopper and bent at their lower ends, as at 32, and bolted to the rear ends, respectively, of the frame bars 9. Preferably, but not necessarily, the fertilizer hopper box straps 31 are secured to the frame bars 9 by the same bolts by which the grain drill seed box straps 33 are secured to the grain drill frame. Each end of the fertilizer hopper 21 is connected to the end of the grain drill seed box by a brace 34 bolted, as at 35, to the associated end wall of the hopper and fastened in any suitable manner to the grain drill seed box adjacent the end thereof. A tapped hexagonal spacer block 39 is disposed between each grain drill box strap 33 and the fertilizer hopper box strap 38 and connect it thereto by a bolt 40. The inside of the hopper is reenforced by one or more braces 38 secured to the front and rear walls of the hopper, as best shown in Figure 2. In this way, the fertilizer hopper is firmly and rigidly secured in position.

Figure 5:
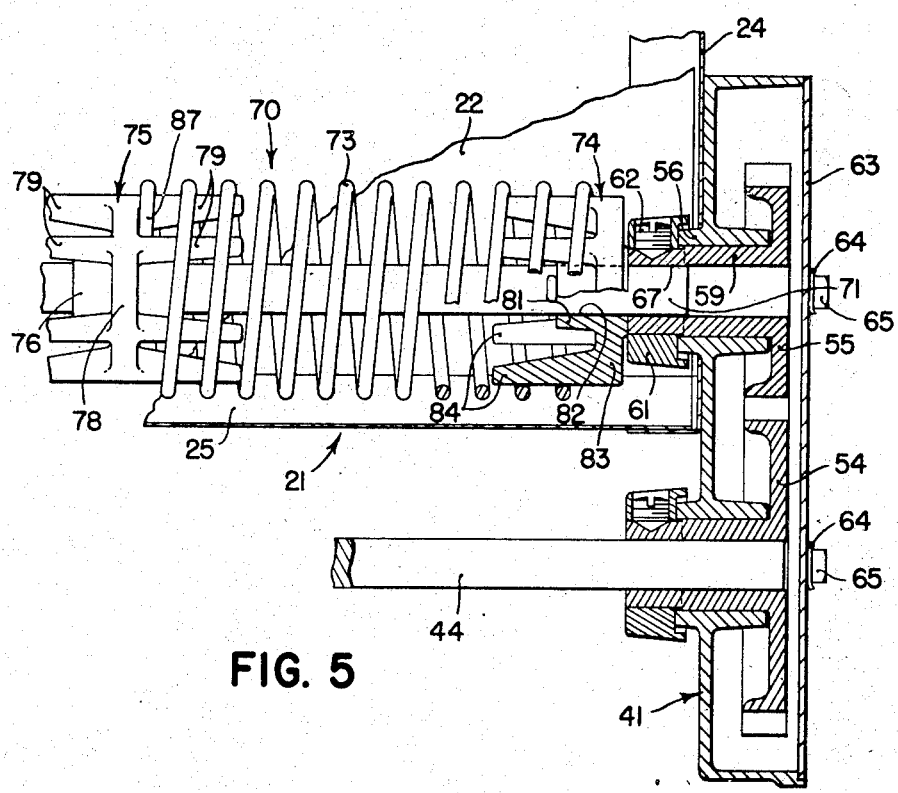
Figure 5 is an enlarged fragmentary section taken generally along the line 5—5 of Figure 2, showing details of the helical spring wire members, the supporting means therefor, and the connection between the distributor shaft and the driving gear.

Rotatably mounted in the bottom of the hopper 21 is a pair of axially aligned distributing members of particular construction which will be described below in detail, and each of the distributing members is driven independently of the other by a connection with the axle shaft at that side of the drill. As best shown in Figure 1, there is mounted at each side of the fertilizer hopper 21 a gear case 41 and a shaft supporting bracket 42 spaced laterally inwardly thereof, the latter being bolted to the rear side and bottom walls of the hopper. The gear case 41 and the bracket 42 are formed with sleeve sections in which a feed shaft 44 is journaled for rotation by suitable bushings, the shaft 44 itself being square or some other non-circular section. A pinion 45 is fixed to the associated axle shaft 16 and has trained over it a sprocket chain 46 which, at its upper end, passes over a sprocket gear 47 that is journaled for rotation on the laterally inner end of the associated shaft 44. Suitable clutch mechanism 48 serves optionally to connect the sprocket member 47 to the shaft 44 to establish a driving connection between the axle shaft 16 and the feed shaft 44. The clutch 48 includes an arm 50 that is connected by a link 51 to an arm 52 that is fixed to the grain drill lifting shaft 13, and the parts are arranged so that when the grain drill furrow openers are raised into inoperative position, which mechanism (not shown) disconnects the seed drive, the arm 52 acts through the link 51 and the arm 50 to disconnect the clutch 48 and interrupt the drive from the axle shaft 16 to the fertilizer feed shaft 44. The laterally outer end of the shaft 44 receives a gear 54 suitably fixed thereto and disposed within the lower portion of the gear case 41, and the gear 54 meshes with a companion gear 55 also journaled in the gear case 41. As best shown in Figure 5, the latter is formed with a bearing or sleeve section 56 which extends through an opening in the associated fertilizer end wall 24 and into the interior of the fertilizer hopper 21. The gear 55 is formed with an elongated hub section 59 which is chilled to provide a bearing surface and which is rotatably disposed in the bearing sleeve section 56 of the gear case 41. The hub section 59 is longer than the sleeve section 56 of the gear case and therefore extends laterally into the hopper a sufficient distance to receive a collar 61 which is secured to the feed shaft gear hub 59 by a set screw 62. The collar bears against the laterally inner end of the gear case bearing sleeve section 56 and therefore holds the gear 55 in position. A cover 63 consisting essentially of a flat plate section, is secured in place over the open side of the gear case 41 by clips 64 bolted, as at 65, to ears 66 formed on the sides and lower portions of the gear case. It will be noted that the axial opening 67 of the gear hub is square in section to correspond to the square section of the shaft of the associated distributing member, which will now be described.

Each distributing member, there being two disposed in axially aligned relation along the bottom of the hopper as mentioned above, is indicated by the reference numeral 70 and comprises a square shaft 71, a plurality of helical spring wire members 72 and 73, and a plurality of spiders or supporting members 74 and 75 on which the several helical spring wire members 72, 73 are supported in generally concentric relation about the shaft 71. In the form of the invention shown in Figures 1 and 2, the intermediate spiders 75 are formed with a central hub section 76 having a square opening 77 therein and a flange section 78, the periphery of which is undulating in form, the radially outer portions of which are formed with and carry oppositely extending spring supporting fingers 79. A spider 74 of somewhat different construction is disposed at each end of the shaft 71, having only one set of spring supporting fingers instead of two as in the case of the intermediate spiders. In Figure 5 the end spider 74 is shown as including a hub 81 having a square hole 82 therein, a flange section 83 and a set of spring supporting fingers 84 extending from the flange section 83 in one axial direction. It will thus be noted that the spider members 74 and 75 are of substantially identical construction except that one is provided with a set of spring supporting fingers extending in opposite directions while the other is provided with only one set of fingers extending in only one direction. The end spiders 74 and alternate intermediate spiders 75 are fixed, as by cotter keys, against sliding movement on the shaft 71, but the other intermediate spiders are free to slide. However, the associated springs 72, 73 are connected between adjacent pairs of spiders, respectively, and yieldingly hold the slidable spiders in position substantially midway between said fixed spiders.

The helical spring wire members 72 and 73 are of substantially the same construction except that one is wound with a right-hand lead and the other is wound with a left-hand lead. As best shown in Figure 5, each of the spring members 72 and 73 is formed with its opposite ends bent so as to extend radially inwardly in between the fingers of the associated spiders whereby, in effect, the spring members are connected to rotate with the shaft 71 but may be moved freely away from the associated spider or spiders axially. The inwardly bent ends of the spring members 72 and 73 are indicated, respectively, by the reference numerals 86 and 87. Preferably, there are as many helical spring wire members 72 and 73 as there are fertilizer discharge openings 29, and each spring member is disposed with its central portion overlying the associated discharge opening so as to secure a continuously uniform circulation of material past each opening 29, as will be explained in detail below. The other distributing member 70 is preferably like the one just described, and therefore the description of the one distributing member 70, above, will suffice.

The two distributing members 70 are, according to the present invention, rotatably supported in the hopper 21 by means which makes the removal of the members 70 for cleaning and other purposes, a conveniently and quickly performed operation. As best shown in Figure 5, the laterally outer end of the shaft 71 of each member 70 is square in section, as mentioned above, and is adapted to be inserted into the laterally inner end of the associated driving gear hub 59, and the inner end of the gear hub 59 extends into the hopper just sufficient to receive the laterally outer end of the associated shaft 71. As a result of this arrangement, merely inserting the end of the shaft in the hub of the driving gear is sufficient to establish driving relation between the driving gear 55 and the associated distributing member 70. To facilitate this rapid and convenient installation of the member 70, the central portion of the fertilizer hopper is provided with novel bearing means which is particularly formed to receive the laterally inner ends of the shafts 71 of the two members 70 and so constructed and arranged that by the mere removal of one part, the laterally inner ends of the shafts 71 may be removed and then each unit 70 lifted out of the hopper. The center bearing construction will now be described.

Figure 6:
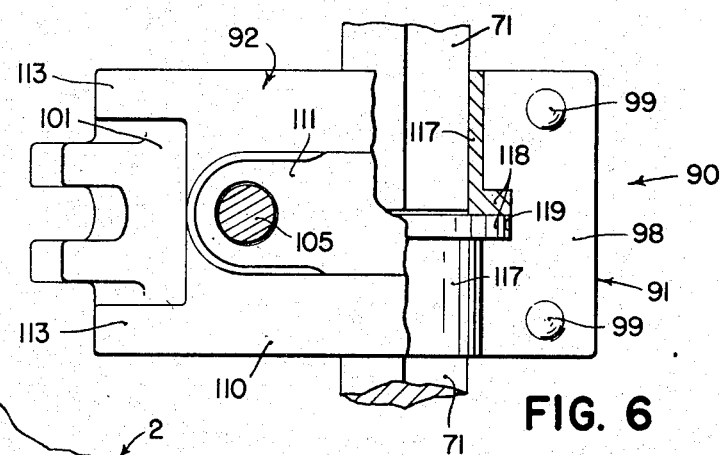
Figure 6 is an enlarged fragmentary plan view looking downwardly on the center bearing.
Figure 4:
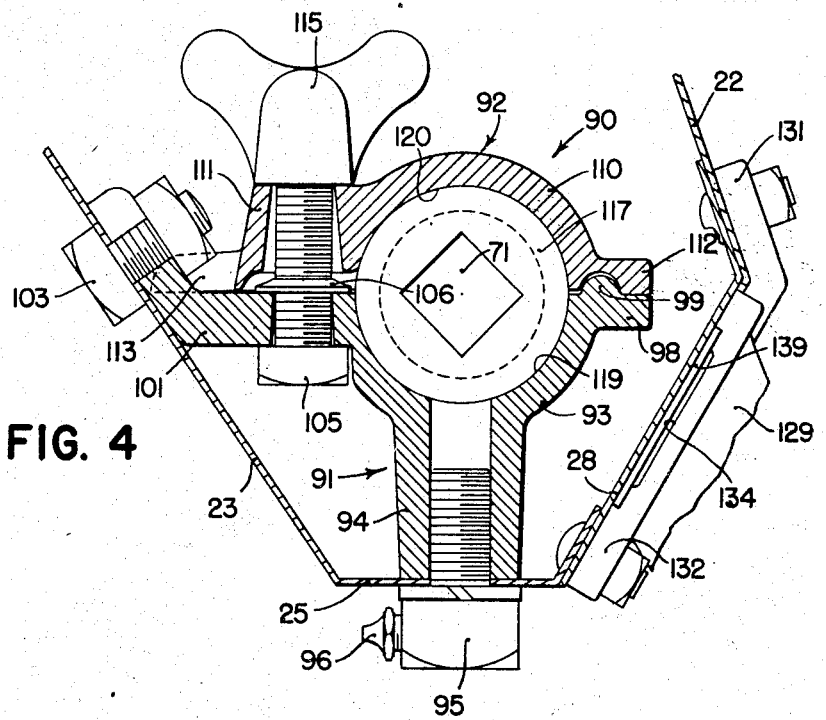
Figure 4 is a section taken along the line 4—4 of Figure 1, showing details of the removable center bearing for the inner ends of the two helical spring wire distributors.

Referring now to Figures 4 and 6, the center bearing is indicated in its entirety by the reference numeral 80 and includes a lower half 91 and an upper or removable half 92. The lower bearing half 91 includes a semi-cylindrical socket section 93 and a pedestal section 94, the lower end of which is tapped to receive a combined stud and lubricating fitting 95. The latter preferably extends up through an opening in the bottom of the hopper and serves to fasten the lower bearing half 91 in position. The lubricant connection is indicated at 96, and lubricant is directed upwardly to the bearing socket 93 through a suitable passage. At one side of the socket 93 the lower bearing half 91 is formed with a lug 98 in which locating projections 99 are formed, the projections extending upwardly. At the other side of the lower bearing half the latter is provided with an extended section 101, the outer portion of which is bifurcated and extended upwardly at an angle that corresponds to the angled hopper wall section 23. A bolt or other fastening means 103 serves to secure the bearing extension 101 to the inclined hopper wall. This section of the bearing member 91 is apertured to receive a fastening bolt 105, and the latter is held permanently in place by means of a cupped washer 106 so that the bolt 105 becomes a permanent part of the bearing and serves as a stud by which the upper or removable bearing half may be connected thereto. The cupped washer 106 has an aperture which, when the washer is in cupped form, can be passed over the threaded end of the bolt 105. Then the washer is flattened, which operation forces the washer 106 against the shank of the bolt 105 so that the latter is thus permanently fixed in position. The head of the bolt 105 engages a part of the bearing so that the bolt is thus held against turning.

The upper half of the bearing, indicated at 92, comprises a companion socket section 110 and an apertured lug 111 which is adapted to be passed over the upper end of the attaching bolt 105. A part of the upper bearing half 92 is extended, as at 112, and is provided with small sockets to receive the projections 99 on the lower bearing half. As shown in Figure 6, the apertured bearing extension 111 has lugs 113 which are spaced apart so as to embrace the bifurcated portion of the extension 101 on the lower bearing half, this being the portion that is fastened to the hopper wall by the bolt 103. A thumb nut 115 having a blind tapped opening to receive the upper end of the bolt 105, is threaded onto the bolt 105 and serves to clamp the upper bearing half to the lower half, the two parts being brought into the proper relative position by the lugs 99 and 113. A cylindrical bushing 117 is mounted on the laterally inner end of each shaft 71, and each bushing is formed with a radial flange 118. The socket sections 93 and 110 of the two bearing parts are formed with grooves 119 and 120, respectively, which are dimensioned to receive the flanges 118, the latter being disposed one against the other when both distributor members 70 are in position.

It was mentioned above that the upwardly disposed hopper wall section 28 is provided with a plurality of discharge openings, preferably the same number as the number of helical springs in the two distributor members 70. The hopper wall sheet 28 includes a portion 128 bent at an angle so as to lie against the forward hopper wall 22. A spout casting 129 is fixed to the hopper in registering relation with each of the discharge openings 29. The several spout castings are identical so that a description of one will suffice. Each spout member 129 includes a pair of attaching lugs 131 and 132 disposed at the proper angle one with respect to the other so that one may be secured, as by bolts or the like, to the lower portion of the inclined wall 28 while the other may be secured in like manner to the lower portion of the front wall 22, preferably by the same means that secures the bent section 128 of the gate wall 28 to the front wall 22 of the hopper. Each spout casting 129 includes a discharge passage 133 which extends generally downwardly and forwardly, the passage 133 being generally oblong in section to correspond to the general form of the openings 29, as will be described below. Each spout member 129 is provided with a recessed part 134 which forms a slide to receive a shiftable gate indicated in its entirety by the reference numeral 139. Preferably, the number of openings in the hopper wall is divided into two banks, corresponding to the arrangement of two separate and independently rotatable distributor members 70. The shiftable gate 139 is provided with a plurality of rectangular openings 141 corresponding in number to the hopper discharge openings in each bank, there being two shiftable gate members 139.

Figure 10:
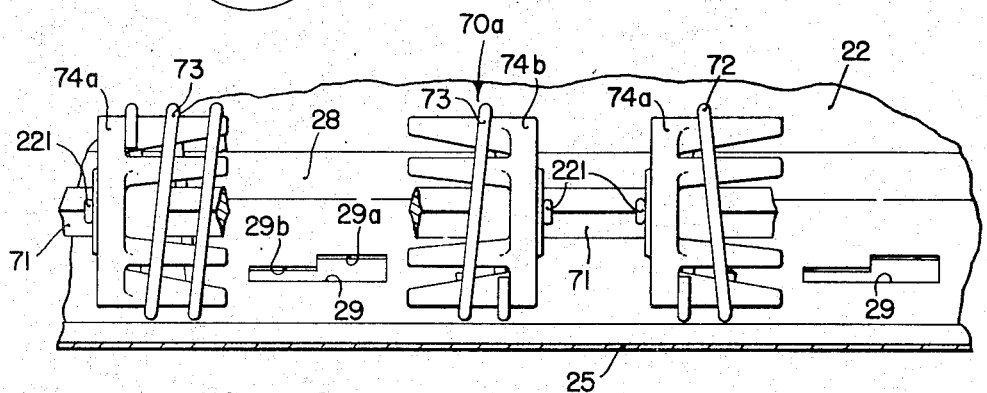
Figure 10 shows a modified form of the helical spring wire distributing members.

As best shown in Figures 1 and 10, the several openings 29 in the hopper gate sheet 28 are formed so as to provide two ranges of feed adjustment. To this end each of the openings 29 includes a wide section 29a and a narrow section 29b extending generally longitudinally of the hopper wall 28 and having an overall length the same as the length of the rectangular openings in the shiftable gate member 139. The latter member can be shifted longitudinally in the slides 134 from a position in which all flow is cut off to a position in which the openings 29 and 141 are in full registry, which represents a position of maximum flow. The purpose of having the openings 29 formed with a wide portion and with a narrow portion is to provide two ranges of adjustment. When the shiftable gate member 139 is moved so that portions of the narrow section 29b only are exposed, a fine or accurate adjustment for small flows is possible, say when planting around ten pounds of fertilizer per acre. On the other hand, when the gate member 139 is shifted so that portions or all of the wider opening 29a are exposed, then a relatively coarse adjustment is provided but with appreciably larger quantities, say around several hundred pounds per acre. Thus, within a relatively limited range of movement of any shiftable parts, I am enabled to secure accuracy at low flows and appreciable quantities at greater flows when it is desired to distribute such large quantities.

The mechanism for shifting each of the shiftable gates 139 is best shown in Figures 1 and 3. Referring now to these figures, and remembering that there are two shiftable gates along the wall 28 of the hopper, I provide a gate shifter bracket 145 spaced inwardly a distance from each end of the hopper. The gate shifter bracket 145 consists of a casting or other member having a pair of apertured ears 146, a second apertured section 147, a bearing section 148, and a dial or indicator section 149. The apertured ears 146 and 147 receive bolts or other attaching means by which the bracket is fastened to the lower forward corner of the hopper, adjacent the juncture of the hopper walls 25 and 28. The portion 148 of the gate shifter bracket 145 carries a pivot 152 on which a gate shifting lever 153 is mounted. The lower part of the bracket 145 is slotted, as at 150, arcuately about the pivot 152. The outer or rear end of the lever 153 is apertured at 156 to receive a clamping bolt and wing nut, indicated at 154, and outwardly beyond the clamping means 154 the lever 153 is apertured, as at 155, and at 157 is formed with a V-shaped notch or depression. The bolt 154 passes through the slot 150. An index pointer 159 is secured by a bolt or rivet in the opening 156 and is provided with a pointed end 160. The pointed end 160 overlies the indicator section 149 of the gate shifter bracket 145, the section 149 having graduations formed thereon with which the pointer 159 cooperates. The pointer 159 is capable of being shifted relative to the lever 153 to which it is attached so as to provide for securing a manufacturing adjustment. After the setting of the pointer on the lever 153 to correspond to the flow which that adjustment of the shiftable gate actually secures, the end of the pointer 159 overlying the notch is struck a blow with a suitable instrument so that a part of the material of the pointer is forced down into the notch 157. This then retains the pointer 159 in the proper position and insures accuracy of indication.

The inner end of the gate shifting lever 153 carries a socket casting 165 riveted or otherwise suitably secured thereto, the casting 165 serving to receive a pin 167 which is carried by and extends outwardly from the shiftable gate member 139. As best shown in Figure 3, the purpose of the socket in which the gate pin 167 is received is to accommodate the pivotal movement of the adjusting lever 153 while the gate pin moves linearly. In order to adjust the rate of flow, the clamping nut 154 is loosened and then the lever 153 shifted to the desired position, after which the clamping nut 154 is again tightened, but still retains the desired adjustment. At the point where the pin 167 is mounted, the gate 139 has an offset 139a to accommodate the head of the pin, which preferably is riveted in place.

In order to secure uniform movement of the fertilizer toward the two distributing members 70 and to prevent the formation of or to break up agglomerations of fertilizer, I provide a pair of pivoted baffles or agitating members, hinging the same on one wall of the hopper in substantially leak-tight relation and permitting the other edge of each baffle to ride over the undulative portions of the rotatable distributing members. Referring now to Figures 1 and 2, each baffle and agitator member is indicated by the reference numeral 175, there being two members disposed in the hopper, and since these members are identical a description of one will suffice. Each member 175 consists of a plate or sheet 176 having its upper marginal section bent downwardly, as at 177. A baffle supporting strip 178 is fixed as by rivets or the like to the inside of the front hopper wall 22, and each strip includes an upwardly bent part 179 that is disposed at an angle to the remainder of the part. This strip 178 thus forms a trough-like support receiving the edge of the bent baffle section 177, the angle between the main body portion of the member 178 and the upwardly bent part 179 being such that a limited amount of pivoting or angular movement of the baffle sheet is permitted. It will be noted that, in effect, this construction serves as a hinge, yet there are no open places through which fertilizer may leak directly into the lower portion of the hopper and reach the discharge spouts without being fed thereto by the distributing member 70. The lower edge of the baffle sheet 176 is disposed substantially in contact with the distributing member 70 at the side thereof adjacent the rear wall 23 of the hopper, being bent downwardly along its lower edge, as indicated at 180. A plurality of baffle riders 181 are secured to the lower edge of the baffle 175, each rider having a cam section 182. The riders 181 are spaced along the baffle so that when the latter is hingedly supported in the strip 178, the rider cam sections 182 come substantially directly over the respective spring supporting spiders of the associated distributor 70. The spiders, as described above, are formed with undulatory flanges, and these are the portions which the rider cams 182 engage. Therefore, whenever the distributor 70 is rotated the baffle experiences oscillatory movement about its hinged support in the hopper strip 178.

There are two baffles, just as there are two agitating members 70, and at their laterally inner edges, each baffle is cut back, as at 185, to provide clearance for the center bearing structure described above by which the inner ends of both of the agitator members 70 are supported in the hopper. This space is closed by a canvas flap 186, the upper end of which is secured between the strip 178 and held in place by the rivets fixing the strip 178 to the front wall 22.

For the purpose of yieldingly holding each baffle down against the associated agitator member 70, I provide a plurality of spring wires 190. Each member 190 is formed of a single length of spring wire, and secured to the baffle at a plurality of points thereon, preferably corresponding to the number of riders 181, is a plurality of handle members 192, each of which has a section 193 that is attached directly to the baffle sheet and is provided with a socket 194 in which the lower end of the associated spring wire 190 is adapted to be seated. The upper edge of the rear hopper wall 23 is beaded, as shown at 27, and at points therealong corresponding to the number of handles 192, the bead 27 is interrupted to provide a plurality of openings in which the upper ends of the several spring wires 190 may be seated. The springs 190 are of such a length that when the ends are placed in their respective sockets the wire occupies a bent position and hence is effective by virtue of its resilience to hold the baffle against the agitator member 70 with yielding pressure.

Figure 11:
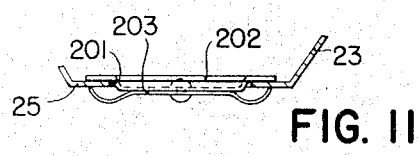
Figure 11 is a sectional elevational view taken along a line 11—11 of Figure 1, and showing the cleanout door.

The bottom sheet 25 of the hopper is provided with one or more clean-out openings 201 which normally is closed by a cover 202, preferably formed as a plate with a central recessed section to fit the clean-out hole 201 (Figures 1 and 11). A pair of spring clips 203 are rotatably secured to the hopper bottom and engage each door 202 for holding it in place, the clip on the far side of the opening 201 being shown in Figure 1.

Figure 9:
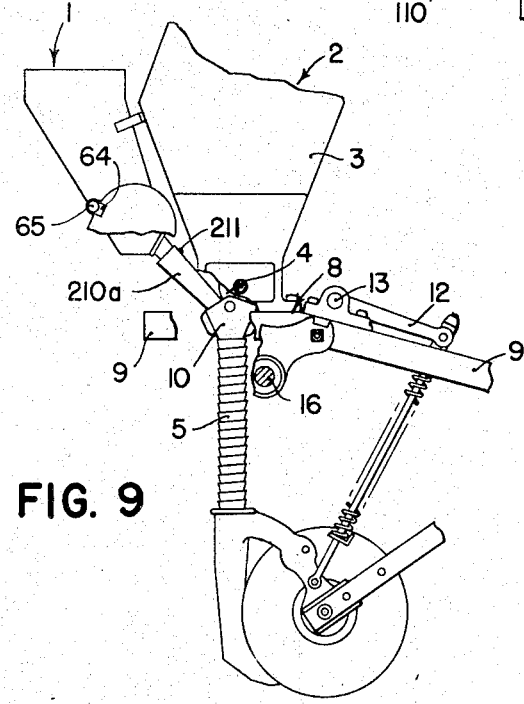
Figure 9 is a fragmentary side view disclosing a modified construction in which the fertilizer attachment delivers fertilizer into the seed tubes of the grain drill.
Figure 7:
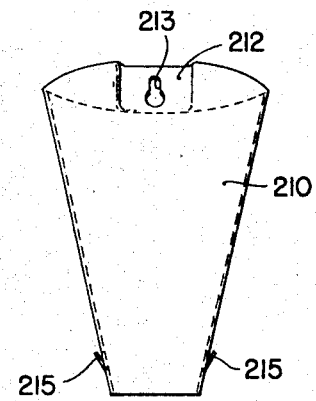
Figure 7 is a view of one of the fertilizer spouts that is adapted to discharge into separate fertilizer tubes.

Material that is fed through the spouts 129 may, if desired, be conducted directly to the seed spouts 10 by any suitable means, but preferably I provide separate spouts 210 formed, as best shown in Figures 2 and 7, so that the upper end of each is large enough to receive the lower end of the associated spout casting 129. As best shown in Figure 2, the spout castings 129 extend downwardly and forwardly. A headed stud 211 (Figure 8) is fixed to each spout casting 129, and for cooperation therewith the associated spout 210 is provided with a reentrant section 212 which is formed with a button hole 213. The larger portion of the hole 213 is formed to pass over the head of the stud 211 so that the more narrow section of the hole 213 engages underneath the head of the pin 211 so as to hold the spout 210 against dropping away from the associated spout casting 129. The angle of the reentrant section 212 corresponds approximately to the angle at which the lower portion of the spout casting 129 extends downwardly, so that when each spout 210 is fastened in place, as just described, the main body portion of each spout 210 hangs in a substantially vertical position. The spouts 210 are adapted to receive special fertilizer tubes, which may be made of rubber or rubber-like material, and to secure such tubes in position, the lower portion of each spout 210 is provided with a pair of punched-out tangs 215. The tubes, indicated by the reference numeral 216, that are supported from the spouts 210, lead downwardly so as to release the fertilizer and place the same behind the seed deposited by the grain drill furrow openers. If it is desired to release the fertilizer through the regular seed tubes, modified forms of the spouts 210 may be employed, certain modified forms being shown at 210a in Figure 9 as having substantially the same construction except that the button holes 213 will be formed in the wall of the spout proper, rather than in a reentrant portion, such as 212, in Figure 7. Such modified spouts will thus extend generally downwardly in direct alignment with the spout castings 129 and deliver the fertilizer directly into the seed spouts 10.

A modified form of distributor member is shown in Figure 10. In the form of the invention described above, where the distributor member 70 consists of a plurality of pairs of right and left hand helical spring members mounted on spiders that are carried on a square shaft, the spacing of the spring members corresponds to the spacing of the discharge openings 29 in the hopper gate sheet 28, and in this form of the invention the end spiders 74 are provided with fingers that extend only in one direction while the intermediate spiders are provided with fingers that extend in both directions. In this construction, therefore, the spacing of the discharge openings is determined by the arrangement of the springs, and vice versa, it being remembered that according to the present invention the intermediate portion of the spring registers with the associated discharge opening. In order to provide for variation in the spacing between the discharge openings, it being the custom in certain sections to sow grain at a certain spacing while the custom in other sections is to sow at different spacings, the present invention contemplates constructing the distributor members 70a so that the distributor member may be adapted to be adjusted for different spacings. Referring now more particularly to Figure 10, the distributing member 70a comprises a shaft 71 like that described above and a plurality of springs 72 and 73 substantially identical with the members described above. However, each spring member is supported on two half spiders, the latter being indicated by the reference numerals 74a and 74b, these members being, for all practical purposes, identical with the half spider 74 described above in connection with Figures 1 to 3. In order to maintain the distributing helical springs in their proper axial position, each spider is held against outward axial displacement, relative to the associated spring, by a cotter pin 221. Preferably, the shaft 71 is provided with a plurality of openings in which the cotter pins 221 may be disposed in various positions whereby the spiders 74a and 74b may be mounted in different spaced relations, as desired.

The clutch mechanism 48, mentioned above as controlling the drive from each axle shaft 16 to the associated fertilizer feed jackshaft 44 is best shown in Figure 1 and, in addition to the driving sprocket gear 47, includes a pair of clutch elements 225 and 226, the latter being non-rotatably mounted on the jackshaft 44. The bracket 42 is particularly constructed so as to have a stationary cam surface 227 which includes an axially extended notched dwelled portion 228 with which a similarly formed dwell 229 on the cooperating cam section of the throwout lever 50 is adapted to engage. The lever 50 bears against the adjacent face of the sprocket gear 47 and serves to control the axial position of the clutch element 225 relative to the clutch element 226. A spring 231 bears at one end against a collar 232 that is fixed to the outer end of the jackshaft 44 and at its other end bears against the opposite face of the gear 47. Thus, when the throwout lever 50 is in one position, the camming elements 228, 229 permit the spring 231 to force the gear 47 and the clutch element 229 toward the other clutch element 226, thereby establishing a driving connection, and when the arm 50 is in its other position the member 47 is forced to the left against the bias of the spring 231, thereby separating the clutch elements 225, 226 and disconnecting the drive. Normally, the arm 50 is not rocked far enough to bring the notched portions 228 and 229 into engagement, but the arm 50 may be turned by hand into this position, shown in Figure 1, so as to hold the fertilizer out of operation when the drill is in operation.

The bracket 42 that supports the laterally inner end of the jackshaft 44 also serves as a support for a chain tightener, and the latter comprises an arm 235 carrying a curved segment 236 which bears against the chain 46. The chain tightener arm 235 has one end 237 bent laterally and pivoted in a sleeve section 238 formed on the bracket 42. A spring is anchored at one end to the outer end of the arm 235 and at its other end to a lug formed on the bracket 42 so as to urge the chain tightener toward chain engaging position.

It will be noted, particularly from Figure 2, that the springs of the distributor 70 are of fairly large diameter, compared to the width of the openings 29, and that they are disposed fairly close to the plane of the openings 29 in the inclined wall 28 but a substantial distance above the bottom wall 25. Having the springs of substantial diameter results in a construction in which the spring coils are practically straight sections moving at a uniform rate across the feed openings. This makes for a steady and uniform feed. However, at all other points the springs 72 and 73 are spaced well away from adjacent walls so that packing of the fertilizer is eliminated. As best shown in Figure 1, the turns are quite close together and normally the springs are filled with fertilizer, due to the action of gravity and of the baffle and also due to the rotation of the distributor, which is in the direction of the arrow shown in Figure 2.

Normally the spring ends are arranged so as to lie loosely between the spider fingers. Thus, the springs are untensioned in operation and do not tend to buckle, which if it occurred, would result in portions of the spring moving closer to the bottom and gate sheets 25 and 28 than other portions.

The operation of the fertilizer distributor described above is as follows:

When the seeding furrow openers are lowered into operating position the rearward swinging movement of the arm 52 rocks the member 50 into a position permitting the clutch elements 225, 226 to engage and connect the drive between the axle shaft 16 and the jackshaft 44, there being a construction of this kind at each side of the drill. Each distributing member 70 is therefore driven from the associated axle shaft 16, and since the helical spring members 72, 73 are disposed, respectively, with their intermediate portions over the associated discharge opening 29, the fertilizer in the lower part of the hopper is fed in a continuous motion in a lateral direction, that is, longitudinally of the hopper itself, past the opening. The two springs 72, 73 of each pair are wound in the opposite directions so that there is no general movement of the entire mass of fertilizer from one end to the other of the hopper. Instead, by arranging the springs of each pair in right and left hand relation, there is set up a plurality of movements of the fertilizer in relatively small closed circuits or paths, with the result that in each circuit the fertilizer moves along the hopper bottom, and along the inclined hopper wall in which the discharge openings 29 are formed, in a continuous non-pulsating stream. The helical springs 72 and 73 may be arranged to feed the fertilizer toward one another or away from one another, as desired. Preferably, as shown in Figure 1, the springs 72, 73 of each pair move the fertilizer away from the intermediate or common supporting spider 75. In view of the fact that certain of the spiders are slidable on the shaft, both in the form of the invention shown in Figure 1 and the form shown in Figure 10, and due, further, to the fact that the springs 72 and 73 are yieldable, no harm or breakage will result if a bolt, nut, stone or any other foreign object finds its way into the fertilizer hopper. Usually, such foreign object is forced in between the coils of the spring distributor, and once inside the spring, it will remain there until the parts are removed for cleaning. If desired, however, the operator may remove bolts, nuts, stones, etc., from within the distributor spring merely by compressing the spring away from one of the spiders and giving the spring a shake, whereupon the stone or bolt will fall out. Since the spider fingers extend axially and the spring ends lie loosely therebetween, the momentary disconnection of the end of the spring from the spider may be accomplished readily.

It is an important feature of this invention that the fertilizer attachment can be easily cleaned out at the end of the day or at the end of the run. All that it is necessary to do to remove the distributors 70 is to loosen the winged cap nut at the center bearing, take out the upper half of the center bearing, and then lift out the two distributing members. It is, of course, first necessary to remove the two baffles 175, but this is readily accomplished by springing the spring wire members 190 out of the sockets and then lifting the baffles out of the hopper. This latter operation takes only a moment, due to the fact that the baffles are merely resting in the supporting strips 178 and are not actually connected or pivoted thereto by physical pivots. In operation, as the distributing members rotate, the combined baffle and agitator members 115 oscillate as the riders pass over the raised portions of the associated spiders. This provides a uniform delivery of fertilizer to the downwardly moving sides of the distributing members 70 and serve to break up lumps and the like. It is important to note that the combined baffle and agitator of the present invention requires no additional parts, other than the rotatable distributing members themselves to effect the driving and agitation of the baffles. In other words, I provide an oscillatable baffle and positive driving means for the same without the necessity of providing any extra driving parts. When reinserting the baffles after cleaning out the fertilizer hopper, all that it is necessary to do is to drop the baffles into the supporting strips and then spring the members 190 into position.

The characteristics of most fertilizers are such that they tend to pack and cement together, especially if they become damp. One of the principal advantages of the present invention is that, even if the previous cleaning of the fertilizer hopper is not thorough, the presence of caked and cemented fertilizer in the hopper of the present invention is not particularly serious. Each of the distributing members is disposed slightly above or away from the cooperating hopper walls so that there are no contacting parts which might be cemented together very firmly if the fertilizer hopper is left over night with a small quantity of fertilizer therein. Due to this spacing, as well as due to the yielding characteristics of the fertilizer distributors 70, if the machine should be started when packed with wet and cemented fertilizer, the parts will flex and move, one part with respect to the other, so that the square shaft, being non-circular, will serve to break up the lumps and hardened parts of the fertilizer. As best shown in Figure 2, the gate openings 29 are disposed in a plane that is substantially tangent to the helical wire distributor, thus securing constant uniform feed when in operation. Another advantage of the present invention is that the hopper bottom and side walls are all smooth and continuous surfaces so that there are no projecting parts of any consequence which might tend to become caked with fertilizer. Hence, damp fertilizer can be distributed with this type of feed where the ordinary distributing mechanism, that includes rotatable star wheels or the equivalent, would be unsatisfactory.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. A fertilizer attachment for grain drills and the like, comprising a hopper having a generally flat lower wall and a downwardly inclined wall, the latter being apertured, adjustable gauge means controlling the effective size of the aperture or apertures therein, a helical spring fertilizer feeding member mounted for rotation in the hopper adjacent said walls so that the latter are disposed in generally tangential relation, supporting means for said helical spring member including a rotatable shaft and spring supporting spider means rotatable therewith, a combined baffle and agitator rockably mounted in said hopper above said helical spring fertilizer feeding member, means on said combined baffle and agitator engageable with said spider means whereby rotation of the latter rocks said baffle and agitator, detachable spring means for holding said baffle and agitator down in spider engaging position, and spout means receiving fertilizer from the apertures in said inclined wall and directing the fertilizer generally downwardly.

2. Distributing mechanism comprising a hopper, a shaft supported for rotation in the hopper, a plurality of supporting members mounted on said shaft in axially spaced relation, said supporting members being arranged in pairs and one member of each pair being fixed against axial displacement, at least in one direction, relative to the shaft while the other member of said pair is shiftable axially along said shaft, and a helical spring wire distributor connected at its ends with the supporting members of a pair.

3. In a distributor, particularly adapted to handle material that may cake or harden, the combination of a non-circular shaft, a pair of supporting members on said non-circular shaft, one being fixed thereto and the other shiftable thereon, and a resilient distributing member having its ends connected with said supporting members, respectively, the yielding of said resilient member and the non-circular form of said shaft serving to break loose caked or hardened material clinging to the shaft or said resilient member.

4. For use in a distributing apparatus including a hopper having end walls, the combination of shaft receiving bearing means disposed adjacent said end walls, a pair of removable distributing members adapted to be disposed along the bottom of said hopper in endwise alignment, each of said members comprising a shaft adapted at its outer end to be inserted into and supported by the associated bearing means, a flanged bushing at the inner end of each shaft, and a split bearing in the central portion of said hopper and formed to receive the bushings associated with the inner ends of both of said shafts, said bearing being recessed to accommodate the flanges of said bushings.

5. In a distributor, a hopper having side and bottom walls, a rotatable distributing member disposed in said hopper adjacent the bottom thereof and including a shaft mounted for rotation in said hopper, spring supporting spider means including at least one member having an undulating peripheral portion, and helical spring means supported by said spider means for rotation with said shaft, a combined agitator and baffle pivotally connected along one edge with the side wall of said hopper, and means serving as a rider disposed adjacent the other edge of said baffle and engageable with said undulating peripheral portion, whereby rotation of said distributing member oscillates said baffle in the hopper.

6. In distributing apparatus, a hopper, a rotatable distributing member in the lower portion of said hopper, a baffle rockably connected at its upper edge with one wall of the hopper for generally up and down swinging movement, the rockable connection between the upper edge of the baffle and the hopper comprising a supporting strip attached along said wall and having a substantially continuous generally V-shaped baffle-receiving trough and a substantially continuous downwardly turned edge along the upper part of said baffle seated in said trough, the generally V-shaped form of the latter accommodating swinging of the baffle generally toward and away from said distributing member, said rockable connection serving to prevent any material amount of leakage of material over the upper edge of the baffle and into the lower portion of the hopper, and means for swinging said baffle generally about said trough as an axis so as to cause flow of material to said distributing member over the lower edge of the baffle.

7. In distributing apparatus, a hopper, a baffle supporting member extending substantially from one end of the hopper to the other and serving thereby to prevent any substantial amount of leakage of material over the adjacent edge of the baffle, the baffle supporting member including a portion secured to a side wall of the hopper and an upwardly extending continuous marginal section forming with the body of said member a substantially V-shaped trough, a baffle disposed in said hopper, said baffle having a continuous downturned edge at its upper edge adapted to be received by the V-shaped portion of said baffle supporting member, and means for rocking said baffle.

8. In distributing apparatus, a supporting member in the form of a continuous V-shaped trough, a plate member having one edge coextensive with said trough and received by said V-shaped trough and supported with its entire edge in the bottom of the V-shaped trough, the angle between the two parts of the latter accommodating pivotal movement of said plate member about its line of support in said V-shaped trough as an axis, and means for rocking said plate member.

9. In distributing apparatus as defined in claim 8, the combination of spring means for detachably retaining said plate member in said V-shaped trough.

10. In distributing apparatus, as defined in claim 8, further including a hopper in which said plate is supported, serving as a baffle therein, and releasable spring means engaging the baffle plate and the hopper and reacting against the latter for yieldingly opposing movement of the baffle plate in one direction, and means for rocking the baffle.

11. In distributing apparatus, a hopper having baffle-receiving means, a baffle plate engageable with said baffle-receiving means for positioning the baffle in the hopper, releasable spring means engaging the baffle plate and the hopper and reacting against the latter for yieldingly opposing movement of the baffle plate in one direction, means for rocking the baffle, and means serving as spring-receiving sockets on the hopper and on said baffle plate, such spring means including end sections adapted to seat removably in said sockets.

12. In distributing apparatus, a hopper having front and rear side walls and a bottom wall, a distributing member rotatably mounted above the bottom wall of the hopper between the lower portions of the front and rear side walls, a baffle detachably connected along its upper edge with the front wall of the hopper and extending downwardly and rearwardly toward the rear wall thereof, a single length of spring wire bearing at its lower end against the baffle and at its upper end against the rear hopper wall for holding the baffle in a position with its lower edge adjacent the distributing member and the lower portion of said rear hopper wall, and means for rocking the baffle.

13. In distributing apparatus or the like, a hopper, an oscillatable member therein, means for oscillating said member, means forming a socket on the hopper and a socket on said member, and a spring member having its ends seated in said sockets for resiliently holding said member against said oscillating means.

14. In distributing apparatus or the like, a hopper, an oscillatable member, means in said hopper removably receiving said member, means for oscillating said member, means forming a socket on the hopper and a socket on said member, and a spring member having its ends seated in said sockets for resiliently holding said member against said oscillating means and against said member-receiving means, said spring member being removable from said sockets to accommodate the removal of said oscillatable member.

15. In distributing apparatus or the like, a hopper, an oscillatable member, supporting means in the hopper against which said oscillatable member bears at one edge, a rotatable non-circular part, the other edge of said member being adapted to bear against said non-circular part, means forming a socket on the hopper and a socket on said member between the edges of said member, and a spring member having its ends seated in said sockets for resiliently holding said member against said supporting means and said non-circular part.

16. Distributing mechanism comprising a hopper, a shaft supported for rotation in the hopper, a plurality of supporting members mounted on said shaft in axially spaced relation, said supporting members being arranged in pairs and one member of each pair being fixed against axial displacement, at least in one direction, relative to the shaft while the other member of said pair is shiftable axially along said shaft, and an axially resilient distributing member connected at its ends with the supporting members of each pair.

17. In an apparatus for distributing material, a rotatable driving member, a pair of supporting spiders mounted on said driving member in nonrotatable relation with respect thereto and each having a plurality of axially directed fingers, said spiders being arranged so that the fingers on each spider extend generally axially toward the other spider, and a helical coil spring mounted at its ends on the axially extending fingers of said spiders, the ends of said coil spring having inturned portions, the latter and said fingers being disposed in such positions angularly about the axis of said driving member that said inturned portions of the ends of said coil spring fit loosely between said fingers whereby said spring coil is normally in untensioned condition but can be readily disengaged from either spider by merely compressing the spring, thereby permitting removal of stones, bolts and other foreign objects from within the coil spring.

18. For use in apparatus for distributing material including an elongated hopper, a pair of axially aligned shafts therein, agitator means carried thereby, a bearing socket at each end of the hopper for receiving, respectively, the laterally outer ends of said shafts, the outer end of each shaft being freely insertible and removable from the associated socket by axial movement of the shaft, the other ends of said shafts being in close juxtaposition and a journal for both inner ends of said shafts, said journal including separable parts which, when separated, provide for first lifting both of the associated ends of said shafts and then the axial displacement thereof to remove the outer ends of said shafts from said sockets.

19. A fertilizer attachment for grain drills and the like, comprising a hopper having a generally flat lower wall and a downwardly inclined wall, the latter being apertured, adjustable gauge means controlling the effective size of the aperture or apertures therein, a helical spring fertilizer feeding member mounted for rotation in the hopper adjacent said walls so that the latter are disposed in generally tangential relation, supporting means for said helical spring member including a rotatable shaft and spring supporting spider means rotatable therewith, a combined baffle and agitator rockably mounted in said hopper above said helical spring fertilizer feeding member, means on said combined baffle and agitator engageable with said spider means whereby rotation of the latter rocks said baffle and agitator, and detachable spring means for holding said baffle and agitator down in spider engaging position.

20. In distributing apparatus, a rotatable shaft, a pair of spiders non-rotatably but removably mounted thereon and each having generally axially extending supporting fingers with axially opening spaces therebetween, the fingers of one spider being arranged so as to extend toward the fingers of the other spider, and compressible resilient distributing means carried by said fingers and having a generally radially inwardly extending portion at each end thereof disposed in the space between adjacent fingers of the associated spider, whereby the rotation of the latter with said shaft rotates said distributing means, the ends of the latter being removable axially from between said fingers to facilitate removal of said distributing means from said spiders when the latter are removed from said shaft, as for cleaning or the like.

21. The invention as defined in claim 20 further characterized by one of said spiders being slidably mounted on said shaft, and means for limiting the movement of said one spider along said shaft away from the other spider.

22. The invention as defined in claim 20 further characterized by one of said spiders being slidable axially along said shaft and provided with supporting fingers extending axially in opposite directions, and a third spider mounted on said shaft on the side of said one spider opposite the other, said third spider being provided with supporting fingers extending toward said one spider, and a second resilient distributing means supported on said one spider and the fingers of said third spider, said resilient distributing means serving to yieldably apply opposing forces against said one spider to maintain the latter in normally spaced relation to said other spiders.

23. In distributing apparatus, the combination with a hopper having a plurality of discharge openings in one wall thereof, of a distributing member having a plurality of distributing means carried thereby, each of said distributing means including a plurality of helical spring members, and pairs of supports for the spring members, each pair of supports receiving the ends of a spring member, said pairs of supports being mounted on said distributing member with spaces between adjacent pairs, and means for connecting said pairs of supports to the distributing member in different positions axially along said distributing member so as to accommodate different spacing between said discharge openings and to dispose said helical spring members one adjacent each opening and thereby adapt said distributing member for use with different hoppers.

24. The invention as defined in claim 7 further characterized by the V-shaped section of said baffle supporting member being formed by disposing said upturned marginal section at an acute angle to the portion of said supporting member that is secured to the side wall of the hopper whereby a substantial amount of pivotal movement of said baffle in said hopper is accommodated, thereby providing for vertical oscillation of the baffle.

25. Distributing mechanism comprising a hopper, a shaft supported for rotation in the hopper, an axially resilient distributing member, and a supporting member at each end of the distributing member for mounting the same on said shaft for rotation therewith, one of said supporting members being fixedly mounted on said shaft, while the other supporting member has sliding movement thereon.

WILLIAM A. HYLAND.